United States Patent
Deboille et al.

(10) Patent No.: US 6,717,926 B1
(45) Date of Patent: Apr. 6, 2004

(54) APPARATUS AND ASSOCIATED METHOD, BY WHICH TO TRANSMIT BEACON SIGNALS IN A RADIO COMMUNICATION SYSTEM

(75) Inventors: Mickael Deboille, Helsinki (FI); Hiroshi Tobita, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/394,331

(22) Filed: Sep. 13, 1999

(51) Int. Cl.[7] .................................................. H04Q 7/00
(52) U.S. Cl. ........................ 370/330; 370/328; 370/329; 455/515; 375/517
(58) Field of Search ................................. 370/328, 338, 370/346, 450, 321, 324, 326, 337, 345, 347, 330; 455/422, 67.4, 63, 517; 375/146

(56) References Cited

U.S. PATENT DOCUMENTS

| | | | |
|---|---|---|---|
| 5,583,866 A | | 12/1996 | Vook et al. .................. 370/312 |
| 5,600,707 A | * | 2/1997 | Miller, II .................... 370/281 |
| 5,912,921 A | * | 6/1999 | Warren et al. ............... 370/332 |
| 6,292,508 B1 | * | 9/2001 | Hong et al. .................. 375/134 |
| 6,327,254 B1 | * | 12/2001 | Chuah ......................... 370/322 |
| 6,400,755 B1 | * | 6/2002 | Harris et al. ................. 370/342 |

FOREIGN PATENT DOCUMENTS

| | | | |
|---|---|---|---|
| WO | WO 97/15168 | 4/1997 | ...................... 7/38 |
| WO | WO 98/45966 | 10/1998 | ...................... 7/24 |

* cited by examiner

*Primary Examiner*—William Trost
*Assistant Examiner*—Danh Le

(57) ABSTRACT

Apparatus, and associated method, by which to generate the beacon signals broadcast by network infrastructure of a radio communication system to mobile stations operable therein. The beacon signals are broadcast at selectable data rates, thereby to be of time durations corresponding to their respective data rates. When implemented in a multi-user, multi-rate communication scheme, communications which are effectuable at higher data rates are performed prior to communications effectuable at only lowered data rates. The beacon signals are transmitted at data rates corresponding to data rates at which communications are effectuated thereabout.

20 Claims, 2 Drawing Sheets

APPARATUS AND ASSOCIATED METHOD, BY WHICH TO TRANSMIT BEACON SIGNALS IN A RADIO COMMUNICATION SYSTEM

The present invention relates generally to communications in a multi-rate capable communication system, such as a WLAN (wireless local area network) operable generally pursuant to the IEEE 802.11 standard. More particularly, the present invention relates to an apparatus, and an associated method, by which to broadcast beacon signals to mobile stations operable in the radio communication system. Broadcast of the beacon signals according to an embodiment of the present invention facilitates efficient usage of bandwidth allocated for communication in a radio communication system, thereby to permit increased efficiency of communications in the radio communication system.

BACKGROUND OF THE INVENTION

A communication system provides for communication of information between a sending station and a receiving station by way of a communication channel. Information to be communicated by the sending station to the receiving station is converted into a form to permit its communication upon the communication channel. A wide variety of different types of communication systems have been developed and are regularly utilized to effectuate communication of information between sending and receiving stations.

New types of communication systems have been, and continue to be, developed and constructed as a result of advancements in communication technologies. A radio communication system is representative of a type of communication system which has benefited from advancements in communication technologies. Increased communication mobility is provided in a radio communication system as radio-links are utilized to form communication channels in a radio communication system in contrast to the conventional need to utilize wireline connections.

The communication capacity of a radio communication system, however, is sometimes constricted by bandwidth limitations. Only a limited amount of the electromagnetic spectrum is allocated to be used by a particular radio communication system. In other words, when the communication capacity is limited by the bandwidth allocated to the radio communication system, an increase in communication capacity requires more efficient utilization of the allocated bandwidth.

Digital communication techniques, for instance, can be used in a manner by which to increase the bandwidth efficiency of communications upon a communication channel in a communication system. Due to the particular need to efficiently utilize the bandwidth allocated in the radio communication system, the use of such digital techniques is particularly advantageously utilized in a radio communication system.

Digital communication techniques typically involve digitizing information, i.e., data, which is to be communicated into digital form to form digital bits. The digitized bits are sometimes then formatted into sequences which form packets of which one or more packets together form a frame. The terms packet and frame shall be, at times, used interchangeably herein to refer generally to digital data which is to be communicated. The sequences of the data forming the packets or frames can be communicated at discrete intervals and thereafter connected theretogether to recreate the informational content of the data.

Because packets or frames of data can be communicated at discrete intervals, a frequency band need not be dedicated solely for the communication of data generated by one sending station for transmission to one receiving station, as conventionally required in analog communications. Instead, the frequency band can be shared amongst a plurality of different sending and receiving station pairs. Because the same frequency band can be utilized to effectuate communications by the plurality of pairs of communication stations, improved communication capacity is possible.

Conventional LANs communicate packets of data to effectuate communications therein. Wireless networks, operable in manners analogous LANs, referred to as WLANs (wireless local area networks) have also been developed and are utilized to communicate data over a radio-link.

The standards of operation of an exemplary WLAN are set forth in the IEEE (Institute of Electrical and Electronic Engineers) 802.11 specification. The standard set forth in the specification provides for multi-user communications. Data is formatted into frames and sent over a radio-link.

As presently-promulgated, the IEEE 802.11 specification defines a contention period (CP) and contention free period (CFP). The contention period defines a random access period during which any sending station is permitted random access to communicate a frame of data. And, the contention free period defines a period in which data is permitted to be communicated responsive to a polling procedure in which allocations are made as to when a sending station is permitted to communicate a frame of data.

The specification, as presently-promulgated, requires that the contention free period be initiated by the broadcast of a beacon signal. And, subsequent beacon signals are broadcast at a beacon interval. A beacon frame is sent during the contention period (CP) as well as the contention free period (CFP). The beacon signal is utilized, amongst other things, for purposes of synchronization of mobile stations operable in the system.

As presently-promulgated, the specification requires that the beacon signals be transmitted at a lowest mandatory rate to insure that all mobile stations operable in the system are able to detect and utilize the informational content of the beacon signal. This existing requirement to broadcast always the beacon signal at the lowest mandatory rate can be an inefficient use of the limited bandwidth.

For instance, if the lowest mandatory rate is a bit rate of 1 Mb/s and in an example situation having eleven mobile stations in which ten mobile stations are operable at a much higher bit rate, e.g., 11 Mb/s, and only one mobile station is operable at the lower bit rate of 1 Mb/s, all of the beacon signals are broadcast at the 1 Mb/s data rate. As the majority of mobile stations are operable at a much higher data rate, the existing requirement of transmitting each of the beacon signals at the lower data rate inefficiently utilizes the limited time available within a contention free period within which to communicate information.

If a manner could be provided by which to broadcast beacon signals in a more efficient manner, improved communication efficiency would result.

It is in light of this background information related to multi-rate, multi-user communication systems that the significant improvements of the present invention have evolved.

SUMMARY OF THE INVENTION

The present invention, accordingly, advantageously provides apparatus and an associated method, by which to transmit beacon signals broadcast to mobile stations operable in a radio communication system such as a (wireless local area network) operable pursuant to an IEEE 802.11 standard.

Operation of an embodiment of the present invention permits increased communication efficiency by selectably broadcasting beacon signals at higher bit rates than a minimum allowable bit rate.

In one aspect of the present invention, a first beacon signal is broadcast to initiate a contention free period (CFP). The first beacon signal is broadcast at a lowest allowable rate to ensure that every mobile station operable in the communication system is able to detect the content of the beacon signal. Subsequent beacon signals are generated at a beacon interval, and subsequent beacon signals are generated at data rates corresponding to the data rates at which subsequent communications are to be effectuated. The communications are sorted such that communications to be effectuated at higher data rates are effectuated first. Thereby, the beacon signal generated immediately subsequent to the first beacon signal is generated at a data rate corresponding to the highest data rate at which communications shall be effectuated during the contention free period. Thereafter, a subsequent beacon signal is generated at a next-to-highest data rate at which communications are to be effectuated during the contention free period. Additional beacon signals are generated at the next-to-highest data rate, or lower, depending upon the data rates at which communications are to be effectuated with remaining ones of the mobile stations.

Because beacon signals are broadcast at higher-than-minimum data rates, additional portions of the contention free period can be utilized for the communication of data. That is to say, by broadcasting beacon signals are higher data rates, lessened amounts of time need to be dedicated for such transmissions. A greater proportion of the contention free period is instead utilized for up-link and down-link transmissions of communications.

An embodiment of the present invention is operable in any of various communication systems. In the exemplary implementation, an embodiment of the present invention is operable in a (wireless local area network) constructed pursuant to the IEEE 802.11 standard. As set forth in the standard for WLAN activity at a MAC (medium access control) layer, beacon signals are caused to be broadcast at beacon intervals. In operation of an embodiment of the present invention, the point coordination function selects the data rate at which a beacon signal is to be broadcast responsive to the capabilities of the mobile stations which are to communicate data during the contention free period by providing such data rates selectability to the beacon signals, the contention free period can be used more efficiently, thereby to permit increased efficiency of communications in the communication system.

In one implementation, an access point (AP) forming a portion of the network infrastructure of the WLAN controls communications during the contention free period. A beacon signal is broadcast to initiate the contention free period. The initial beacon signal is broadcast at a lowest allowable data rate in conventional manner. Sorting is performed at the access point to cause communications which are effectuable at higher data rates to be performed prior to effectuation of communications at lower data rates. Beacon signals broadcast at beacon intervals when communications are being effectuated at the higher data rates are broadcast at correspondingly higher data rates. The time otherwise required to broadcast the beacon signals are the lowest permitted data rate is utilized for other purposes. For instance, such time can be utilized to perform retransmission of missed frames within the same contention free period.

A more efficient manner by which to perform communications during the contention free period is thereby provided. Fuller advantage provided by a multi-rate communication system is permitted.

In these and other aspects, therefore, apparatus, and an associated method, is provided for a radio communication system having a network infrastructure with which a first mobile station and at least a second mobile station communicates data. The first mobile station is selected to be communicated at a first data rate and the data to be communicated between the network infrastructure and the second mobile station is selected to be communicated at a second data rate. A beacon signal generator is coupled to receive indications of the first data rate and the second data rate at which the data is selected to be communicated between the network infrastructure and the first mobile station and between the network infrastructure and the second mobile station. The beacon signal signals a first beacon signal and at least a second beacon signal within a selected time period. The first beacon signal is generated at a rate at least as low as the lowest of the first selected rate and the second beacon signal is generated at a rate corresponding to a highest of the first selected rate and the at least second selected rate.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
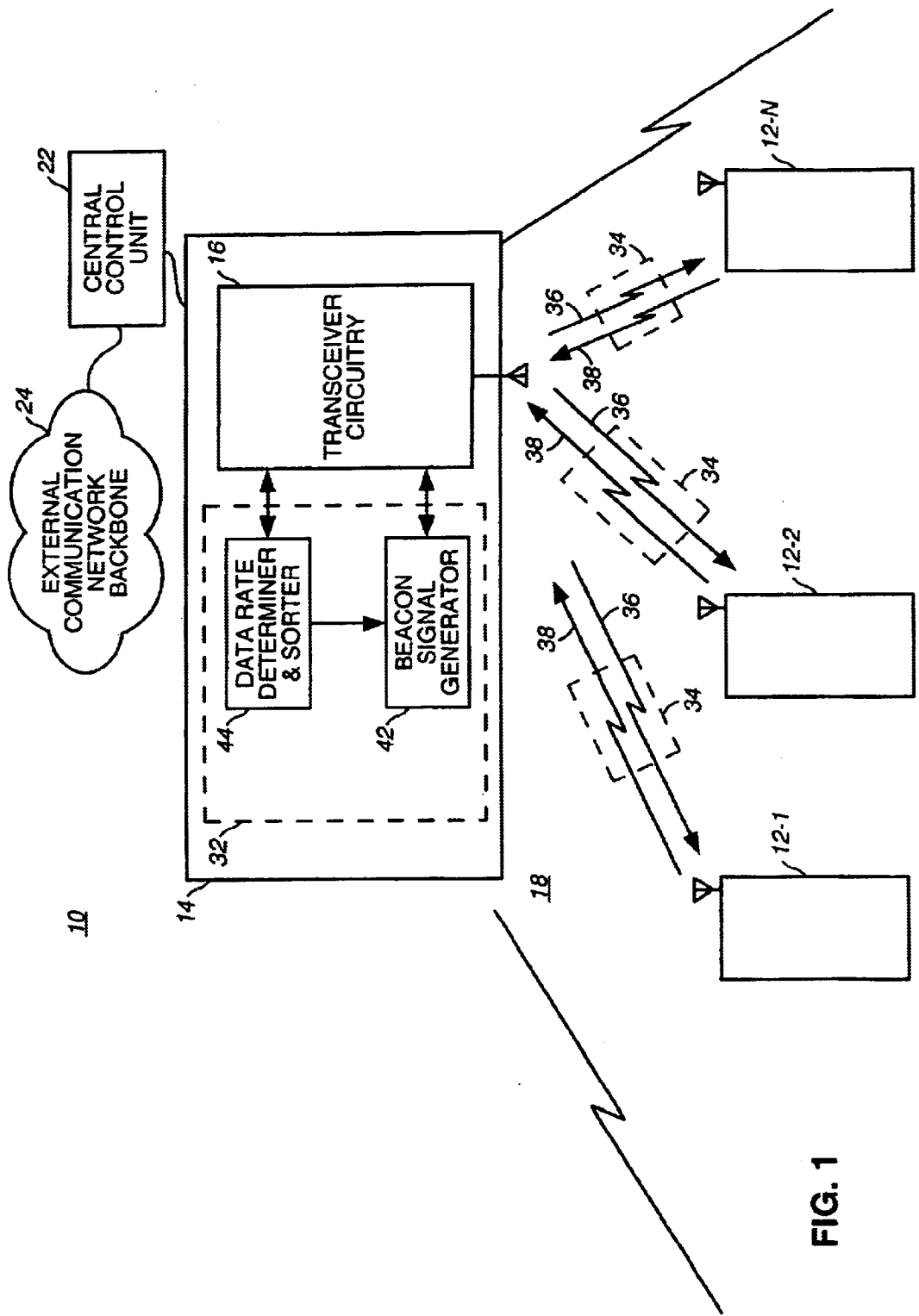
FIG. 1 illustrates a functional block diagram of a radio communication system in which an embodiment of the present invention is operable.

Referring first to FIG. 1, a communication system, shown generally at 10, provides for radio communications with a plurality of mobile stations 12, here identified by 12-1 through 12-N. The communication system is a multi-rated system in which different ones of the mobile stations might be operable at different data rates. In the exemplary implementation, the communication system 10 forms a WLAN (wireless local area network) operable generally pursuant to the standards set forth in the IEEE 802.11 standards, as presently-promulgated. As defined in such specification, multi-user, multi-rate communications are provided with the mobile stations 12. Other types of radio communication systems can similarly be illustrated. And, other embodiments of the present invention are operable in such other communication systems.

A single access point 14 is shown in the Figure. In an actual implementation, the WLAN of which the communication system is formed typically includes a plurality of access points positioned at spaced-apart locations to encompass an area in which radio communications are to be provided pursuant to the WLAN. While the term access point 14 shall be used herein as such term is used in the aforementioned IEEE 802.11 standard, and other communication systems, structure corresponding to the access point 14 is sometimes referred to as a base station or RAD (remote antenna device).

The access point 14 is here shown to include radio transceiver circuitry 16. The radio transceiver circuitry is capable of transceiving radio communication signals with the mobile stations which are positioned within an area, referred to as a cell, 18, proximate to, and defined by, the access point 14. In the exemplary illustration, the mobile stations 12-1 through 12-N are positioned within the cell 18. Due to the mobility inherent of the mobile stations, the number of mobile stations positioned within the cell 18 at a particular time is variable.

The access point 14 is coupled to a central control unit (CCU) 22. Other access points, not shown in the Figure, are similarly also coupled to the central control unit. The central control unit is operable, amongst other things, to perform control functions to control various aspects of operation of the WLAN of which the communication system 10 is formed. The central control unit is further shown to be coupled to an external communication network backbone 24. Other communication devices (not shown in the Figure), such as other communication stations in other communication networks are typically coupled to the network backbone 24.

A mobile station is able to communicate, by way of an access point 14 with another communication station connected to the external communication network backbone 24. Because the communication system is a multi-user system, a plurality of seemingly-concurrent communications can be effectuated between a plurality of mobile stations 12 and a plurality of communication stations. Communications can also be effectuated between pairs of mobile stations 12.

The access point 14 also includes control apparatus 32 of an embodiment of the present invention. The control apparatus 32 is operable, amongst other things, to control sequencing of communications between the access point 14 and the mobile stations 12 positioned within the cell 18. Communications are effectuated between the access point 14 and each mobile station 12 by way of radio links 34. The radio links 34 include the both forward and reverse links 36 and 38, respectively. Signals generated by the access point are transmitted to respective ones of the mobile stations by way of a forward link 36. And, signals generated by respective ones of the mobile stations are transmitted to the access point 14 by way of reverse links 38.

The control apparatus 32 is here shown to include a beacon signal generator 42 and a data rate determiner and sorter 44. Both the beacon signal generator and the data rate determiner and sorter are coupled to the radio transceiver circuitry 16. The beacon signal generator 42 is operable to generated beacon signals to be broadcast, by way of the transceiver circuitry 16 to the mobile stations 12. The beacon signals generated by the beacon signal generator are generated at successive beacon intervals, defined by the IEEE 802.11 specification. The beacon signals generated by the beacon signal generator contain control information and are also utilized for synchronization purposes by the mobile stations 12. The first beacon signal generated by the generator 42 at the start of a contention free period is of a lowest allowable rate of operation of the communication system to ensure that every mobile station to which the beacon signal is broadcast is able to detect and utilize the beacon signal. Subsequent beacons signals are generated at a data rate responsive to determinations and sortings made by the data rate determiner and sorter.

The data rate determiner and sorter is operable to determine the data rate operability of each of the mobile stations and to sort the sequence of communications in a desired manner. In the exemplary implementation, communications which can be effectuated at higher data rates are performed prior to effectuation of communications which can be effectuated only at lower data rates. Indications are provided to the beacon signal generator of determinations and sorting performed by the data rates determiner and sorter. Responsive thereto, the data rates at which the beacon signals are generated and broadcast are selected. Mainly, the beacon signals are generated and broadcast at data rates corresponding to the data rates at which other communications are effectuated during particular portions of the contention free period. Thereby, lessened amounts of time are dedicated to beacon signal transmissions. The time periods otherwise required to broadcast the beacon signals at lower data rates are utilized to communicate other information.

Figure 2:
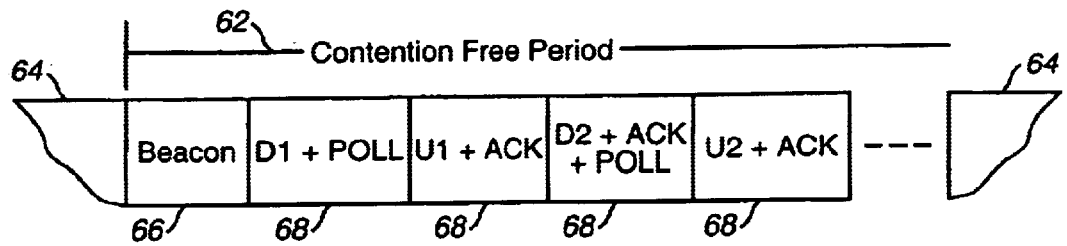
FIG. 2 illustrates a portion of a contention free period (CFP) defined by the communication system shown in FIG. 1.

FIG. 2 illustrates portions of a contention free period (CFP) defined in the IEEE 802.11 specification. As set forth in the specification, the contention free period is defined to be a period during which random access of communications between the mobile stations 12 and the access point 14 is not permitted. During the contention free period, the access point 14 determines which mobile stations are permitted to transmit data. A point coordinator (PC) is implemented at the access points to perform the function of a polling master to make such a determination. Also during the contention free period 62, a point coordinator function of the access point 14, and which embodies both the beacon signal generator and the data rate determiner and sorter, as described above, sorts communications with individual ones of the mobile stations according to their respective data rate operabilities. And, the beacon signal generator causes corresponding beacon signals to be generated at beacon intervals of data rates corresponding to the data rates at which communications are to be effectuated thereabout.

The contention free period 62 is bordered by contention periods (CPs) 64 in which random access to the communication channels by the mobile stations is permitted. As set forth in the IEEE 802.11 specification, the random access channel scheme utilized during the contention period 64 is operable pursuant to a distributed coordination function (DCF). Successive ones of the contention periods 64 are interspersed with a contention free period 62, and, in like manner, successive ones of the contention free periods 62 are interspersed with contention periods. The contention free period 62 is here shown to include a beacon packet 66 and a plurality of data frames 68 positioned subsequent thereto. In the figure, the designation D indicates a downlink transmission upon a forwardlink 36, and an uplink transmission is identified by U on a reverse link channel 38. And, the designation POLL is used to indicate polling of a mobile station of its transmission rate capability. And, the designation ACK is utilized to indicate an acknowledgment of the transmission.

The frames 68 identified by D1 is the left-most (as shown) frame of data within the contention free period. The next frame, identified by U1 contains an acknowledgment indication ACK. Successive frames 68, i.e., frames D2 and U2 similarly include acknowledgment indications ACK acknowledging previously transmitted data.

More particularly, the beacon signal 66 is first transmitted to initiate the contention free period 62. Then the frame 68 identified by "D1+POLL" is sent. D1 refers to data which had not been sent during a previous contention free period and has been maintained by the access point for transmission during the current contention free period. The mobile station, e.g., 12-1 of FIG. 1, which receives the frame is polled by the POLL portion as to whether data is to be communicated therefrom.

Here, there is data to be communicated by the mobile station 12-1, namely, e.g., to the terminal 12-2. So, the frame 68, identified by "U1+ACK" is sent. The ACK is the acknowledgment of the terminal 12-1 that the prior frame had been received, and the U1 portion is the data to be communicated to the terminal 12-2.

The frame 68 identified by "D2+ACK+POLL" is sent by the access point to the mobile station 12-2. The data D2 corresponds to the data U1, as the access point is merely forwarding the data to the terminal 12-2. The ACK is the acknowledgment of receipt of the U1 data. And, the POLL portion polls the terminal 12-2 whether or not data is to be communicated therefrom. The frame 68 identified by "U2+ACK" includes uplink data U2 and an acknowledgment of the receipt of the D2 data.

Figure 3:
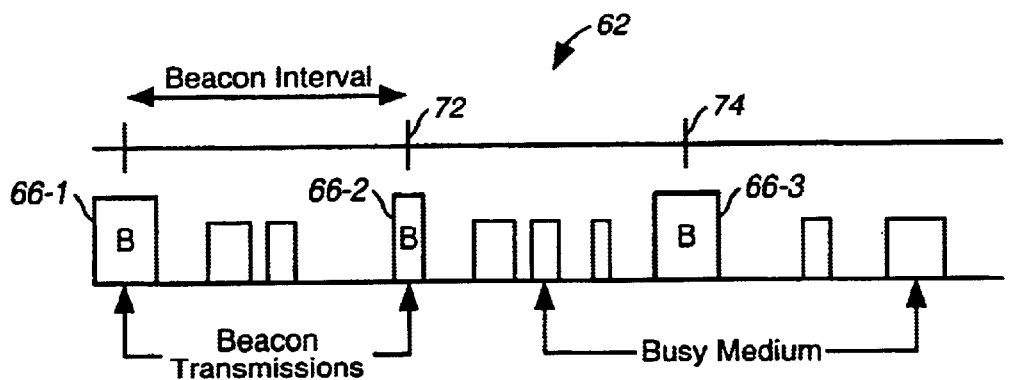
FIG. 3 also illustrates a portion of a contention free period, here illustrating beacon signals of data rates, and corresponding durations, generated during operation of an embodiment of the present invention.

FIG. 3 again illustrates the contention free period 62. Here, a plurality of beacon signals, identified by 66-1, 66-2, and 66-3, are shown to be broadcast during the contention free period. The first beacon signal 66-1 is broadcast at the initiation of the contention free period. And, the second beacon signal 66-2 is broadcast at the first beacon interval 72. The third beacon signal 66-3 is broadcast at determination of a subsequent beacon interval 74. Additional beacon signals, if necessary, are broadcast at successive beacon intervals.

The first beacon signal 66-1 is generated and broadcast at a minimum allowable transmission rate to ensure that all mobile stations are able to detect the beacon signal. The second beacon signal 66-2, however, is broadcast at a higher rate. Because of the different rate at which the beacon signal is transmitted, the duration of the second beacon signal is less than that of the first beacon signal. As noted above, subsequent to broadcast of the first beacon signal, sorting of subsequent communications is performed so that communications which can be effectuated at higher bit rates is performed prior to communication which is effectable at only lower data rates. For so long as communications are effectuated at higher bit rates, the beacon signal generated at the beacon interval is caused to be generated at the corresponding data rate. Because of the shorter duration of the beacon duration, additional amounts of data can be transmitted within a beacon interval.

Alternately, the beacon duration length can be reduced. By reducing the beacon duration, additional available space would be provided. This additional amount of time could be used, e.g., to retransmit missed data.

The following table indicates exemplary durations of beacon signals for different physical layers and different bit rates as specified in the IEEE 802.11 standard specification. The values are exemplary, and other values can alternately be represented.

| PHY layer | Bit rate | Beacon duration (in $\mu$s) |
| --- | --- | --- |
| FHSS | 1 Mb/s | 2600 |
| | 2 Mb/s | 1300 |
| HR/DSSS | 1 Mb/s | 2568 |
| | 2 Mb/s | 1284 |
| | 5,5 Mb/s | 467 |
| | 11 Mb/s | 234 |
| HR/DSSS/FH | 1 Mb/s | 2600 |
| | 2 Mb/s | 1300 |
| | 5,5 Mb/s | 473 |
| | 11 Mb/s | 237 |
| HR/DSSS/short | 5,5 Mb/s | 467 |
| | 11 Mb/s | 234 |
| OFDM | 6 Mb/s | 424 |
| | 9 Mb/s | 283 |
| | 12 Mb/s | 212 |
| | 18 Mb/s | 142 |
| | 24 Mb/s | 106 |
| | 36 Mb/s | 71 |
| | 48 Mb/s | 53 |
| | 54 Mb/s | 48 |

By way of example, where the case of HR/DSSS, the beacon signal duration is 2568 microseconds if the bit rate is 1 Mb/s and 234 microseconds if the bit rate is 11 Mb/s. The difference increases further as the plurality of beacons are transmitted during a contention free period.

By extrapolating, if, e.g., five beacon signals are sent, without operation of an embodiment of the present invention by which to select the data rates at which the beacon signals are broadcast, a total duration of 12,840 microseconds are required for transmission of the five beacon signals. In contrast, through operation of an embodiment of the present invention, if one low-data rate beacon signal is transmitted and three high-rate beacon signals are transmitted and one low-data rate beacon signal is transmitted, the corresponding time period required to transmit the five beacon signals is only 5,838 microseconds.

Figure 4:
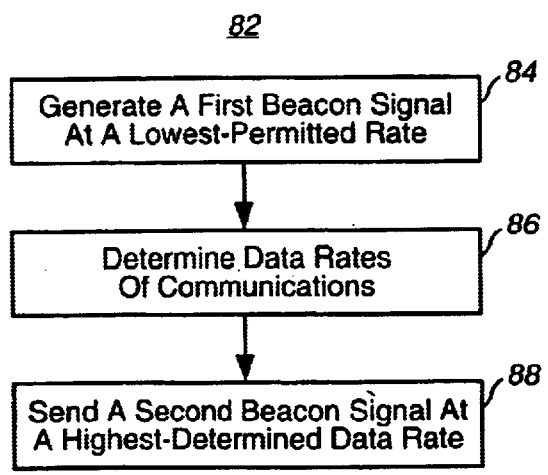
FIG. 4 illustrates a method flow diagram listing the method of operation of an embodiment of the present invention.

FIG. 4 illustrates a method flow diagram, shown generally at 82, of an embodiment of the present invention. The method is operable to facilitate communication of data in a radio communication system having network infrastructure and a first mobile station and at least a second mobile station. First, and as indicated by the block 84, a first beacon signal is generated at a rate corresponding to a lowest rate permitted in the radio communication system. Then, and as indicated by the block 86, data rates are determined at which data is selected to be communicated between the network infrastructure and each of the first and at least second mobile stations.

Then, and as indicated by the block 88, a second beacon signal is generated at a rate corresponding to a highest data rate at which data is selected to be communicated between the network infrastructure and the first and second mobile stations.

Thereby, a manner is provided by which to more efficiently communicate data by selecting the data rate, and corresponding duration, of the beacon signals generated at selected beacon intervals. Improved communication capacity and efficiency, is thereby provided.

The previous descriptions are of preferred examples for implementing the invention, and the scope of the invention should not necessarily be limited by this description. The scope of the present invention is defined by the following claims:

We claim:

1. In a radio communication system having a network infrastructure with which a first mobile station and at least a second mobile station communicate data, the data to be communicated between the network infrastructure and the first mobile station selected to be communicated at a first communication-data data rate and the data to be communicated between the network infrastructure and the second mobile station selected to be communicated at a second communication-data data rate, wherein the communications occur in either a random-access period during which any mobile station may transmit, or in a polled-access period in which only polled mobile stations may transmit, an improvement of apparatus for facilitating communication of the data, said apparatus comprising:

a beacon signal generator coupled to receive indications of the first communication-data data rate and the second communication-data data rate, said beacon signal generator for generating a first beacon signal and at least a second beacon signal within a selected time during the polled-access period;

wherein the first beacon signal generated at a beacon-signal data rate at least as low as a lowest of the first communication-data data rate and the second communication-data data rate such that the first beacon signal is detectable by each of the mobile stations for which the beacon signal generator has received data-rate indications;

and wherein the second beacon signal generated at a rate corresponding to a highest of the first communication-data data rate and the at least second communication-data data rate.

2. The apparatus of claim 1 wherein the radio communication system defines a lowest acceptable data rate and wherein the first beacon signal generated by said beacon signal generator is generated at the lowest acceptable data rate.

3. The apparatus of claim 1 wherein the radio communication system defines a beacon interval, wherein said beacon signal generator generates a beacon signal at each successive beacon interval, the first beacon signal generated at a start of a first beacon interval and the second beacon signal generated at an end of the first beacon interval.

4. The apparatus of claim 1 wherein each of the first and at least second mobile stations, respectively, provide the network infrastructure with an indication of communication-data data rates at which respective ones of the first and at least second mobile stations are operable and wherein said apparatus further comprises a data rate determiner and sorter coupled to receive the indications, said data rate determiner and sorter for determining the first and at least second communication-data data rates at which each of the first and at least second mobile stations are operable and for sorting each of the mobile stations according to communication-data data rate operability associated therewith.

5. The apparatus of claim 4 wherein beacon signals generated by said beacon signal generator are generated at successive beacon intervals and wherein beacon signals subsequent to the first beacon signal are generated at the beacon intervals at beacon-signal data rates corresponding to the communication-data data rates sorted by said data rate determiner and sorter for communication subsequent to each subsequent beacon signal.

6. The apparatus of claim 5 wherein the first communication-data data rate is higher than the second communication-data data rate, wherein said data rate determiner and sorter selects communications effectuable at the first communication-data data rate to be effectuated prior to effectuation of communications effectable at the second communication-data data rate.

7. The apparatus of claim 5 wherein said data rate determiner and sorter selects a communication sequence of communication of the data between the network infrastructure and the first mobile station and between the network infrastructure and the at least the second mobile station, the communication sequence to commence with data to be communicated with a mobile station operable at a highest of the first and at least second communication-data data rates.

8. The apparatus of claim 1 wherein data is communicated with the first and at least second mobile station at the first communication-data data rate, at the second communication-data data rate, and at least a third communication-data data rate and wherein said beacon signal generator is further operable to generate a third beacon signal, the third beacon signal generated at a beacon-signal data rate corresponding to a next-to highest of the first communication-data data rate, the second communication-data data rate, and the third communication-rate.

9. The apparatus of claim 1 wherein a frame structure is defined in the radio communication system and wherein the selected period within which said beacon signal generator generates the first beacon signal and the at least the second beacon signal comprises a frame of the frame structure.

10. The apparatus of claim 1 wherein the polled-access period is a contention free period according to IEEE 802.11 and wherein the beacon signals generated by said beacon signal generator are generated during the contention free period.

11. The apparatus of claim 1 wherein the network infrastructure includes an access point and wherein said beacon signal generator forms a portion of the access point.

12. The apparatus of claim 11 wherein the access point further comprises a point coordinator function and wherein said beacon signal generator is operable pursuant to the point coordinator function.

13. In a method for communicating in a radio communication system having network infrastructure with which a first mobile station and at least a second mobile station communicates data at a rate at least as fast as a lowest-allowable system data rate, the data to be communicated between the network infrastructure and the first mobile station selected to be communicated at a first communication-data data rate and the data to be communicated between the network infrastructure and the second mobile station selected to be communicated at a second communication-data data rate, wherein the communications occur in either a random-access period during which any mobile station may transmit, or in a polled-access period in which only polled mobile stations may transmit, an improvement of a method for facilitating communication of the data, said method comprising:

generating, within a selected time during the polled-access period, a first beacon signal at a beacon-signal data rate corresponding to the lowest-allowable system data rate;

determining, responsive to responses to the first beacon signal, communication-data data rates at which data is selected to be communicated between the network infrastructure and each of the first and at least second mobile stations, respectively; and generating, within the selected time period, a second beacon signal at a beacon-signal data rate corresponding to a highest of the first communication-data data rate and the at least second communication-data data rate.

14. The method of claim 13 wherein the radio communication system defines a lowest acceptable data rate and wherein the beacon-signal data rate of the first beacon signal generated during said operation of generating the first beacon signal is generated at the lowest acceptable data rate.

15. The method of claim 13 wherein the radio communication system defines a beacon interval and wherein the first beacon signal generated during said operation of generating the first beacon signal is generated at a start of a first beacon interval.

16. The method of claim 15 wherein the second beacon signal generated during said operation of generating the second beacon signal is generated at an end of the first beacon interval.

17. The method of claim 13 wherein the network infrastructure includes an access point and wherein said operations of generating the first beacon signal and of generating the second beacon signal are performed at the access point.

18. The method of claim 13 comprising the additional operation, subsequent to said operation of generating the second beacon signal, of communicating data with at least a selected one of the first and at least second mobile stations, respectively, the at least selected one of the first and second mobile stations operable at the highest of the first communication-data data rate and the at least second communication-data data rate.

19. The method of claim 18 further comprising the additional operation of generating a third beacon signal at a beacon-signal data rate corresponding to a next-to highest of the first communication-data data rate and the at least second communication-data data rate.

20. Apparatus for facilitating communication of data in a radio communication system having at least one mobile station operable to communicate with network infrastructure at a first data rate and at least one mobile station operable to communicate with the network infrastructure at a second data rate, wherein the communications occur in either a random-access period during which any mobile station may transmit, or in a polled-access period in which only polled mobile stations may transmit, said apparatus comprising:

a beacon signal generator coupled to receive indications of the first data rate and the second data rate at which communications are possible in the radio communication system, said beacon signal generator for generating a first beacon signal and at least a second beacon signal within a selected time during the polled-access period;

wherein the first beacon signal is generated at a beacon-signal data rate at least as low as a lowest of the first communication-data data rate and the second data rate;

and wherein the second beacon signal is generated at a beacon-signal data rate corresponding to a highest of the first data rate and the second communication-data data rate.

* * * * *